(12) United States Patent
Singh et al.

(10) Patent No.: US 8,750,487 B2
(45) Date of Patent: *Jun. 10, 2014

(54) GUIDING CALLS VIA GRAPHICAL USER INTERFACE

(71) Applicant: Verizon Patent and Licensing Inc., Basking Ridge, NJ (US)

(72) Inventors: Amit Singh, Irving, TX (US); Patrick Smith, Flemington, NJ (US); Vijay Arumugam, Coppell, TX (US); Roopa Kotha, Irving, TX (US); Fariborz Ebrahimi, Calabasas, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/975,900

(22) Filed: Aug. 26, 2013

(65) Prior Publication Data

US 2013/0343535 A1 Dec. 26, 2013

Related U.S. Application Data

(63) Continuation of application No. 13/173,265, filed on Jun. 30, 2011, now Pat. No. 8,520,830.

(51) Int. Cl.
*H04M 3/00* (2006.01)
*H04M 5/00* (2006.01)

(52) U.S. Cl.
USPC ............ 379/265.01; 379/265.09; 379/266.01; 379/309

(58) Field of Classification Search
USPC .................. 379/265.01, 265.09, 266.01, 309
See application file for complete search history.

(56) References Cited

U.S. PATENT DOCUMENTS

| 6,829,350 | B1 * | 12/2004 | Trinkel et al. | 379/265.09 |
| 2007/0083678 | A1 * | 4/2007 | Bateman et al. | 710/6 |
| 2012/0008755 | A1 * | 1/2012 | Mittal | 379/93.01 |
| 2012/0213343 | A1 * | 8/2012 | Gao et al. | 379/88.01 |

* cited by examiner

*Primary Examiner* — Quynh Nguyen

(57) ABSTRACT

A user device may display, via a graphical user interface, questions associated with a voice menu that is used by an interactive voice response (IVR) system to forward calls. The user device may obtain, via the graphical user interface, user responses to the questions. In addition, the user device may send information corresponding to the user responses to the questions to a remote device. The remote device may query the IVR system to identify a call agent, in a call center, whose profile matches the information, obtain contact information of the call agent from the IVR system, and send the contact information to the user device. Furthermore, the user device may receive the contact information from the remote device and display the contact information via the graphical user interface.

20 Claims, 6 Drawing Sheets

GUIDING CALLS VIA GRAPHICAL USER INTERFACE

RELATED APPLICATION

This application is a continuation of U.S. patent application Ser. No. 13/173,265, filed on Jun. 30, 2011, the disclosure of which is incorporated herein by reference.

BACKGROUND

When a user calls a call center, the user may use dual tone multi-frequency (DTMF) tones to perform various functions, such as navigating through a menu tree to receive a service, purchasing a product, accessing information, and/or connecting to one of multiple agents attending the call center. More advanced call centers rely on speech recognition subsystems in place of or in addition to DTMF signaling to provide similar functionalities.

DETAILED DESCRIPTION

The following detailed description refers to the accompanying drawings. The same reference numbers in different drawings may identify the same or similar elements. As used herein, the terms "call forwarding" or "call routing" may include establishing a session between the calling party and a party to which the call is forwarded from the called party. In some instances, forwarding/routing may include terminating a session, if it exists, between the caller and called party. At a call center, a device may forward/route inbound calls to call center agents (e.g., sales person, technical support agent, software agent (as opposed to a person), etc.).

As described below, a system may provide for use of a call guide. The call guide may include a browser or a stand-alone client application for providing a function that is similar to a voice menu. However, the call guide may be more convenient to use than a voice menu. When a user uses the call guide, the call guide may obtain a phone number and/or a quick code/reference number (to be described below). The user may reach a call agent at a call center by dialing the phone number and using the quick code. By using the call guide, the user may avoid navigating through a voice menu provided by an interactive voice response (IVR) system at the call center. In some implementations, the call guide may include a self-serve system. The self-serve system may interact with the user via different components of the system, and allow the user to resolve a particular problem or an issue without involving a call agent in the call center.

Figure 1:
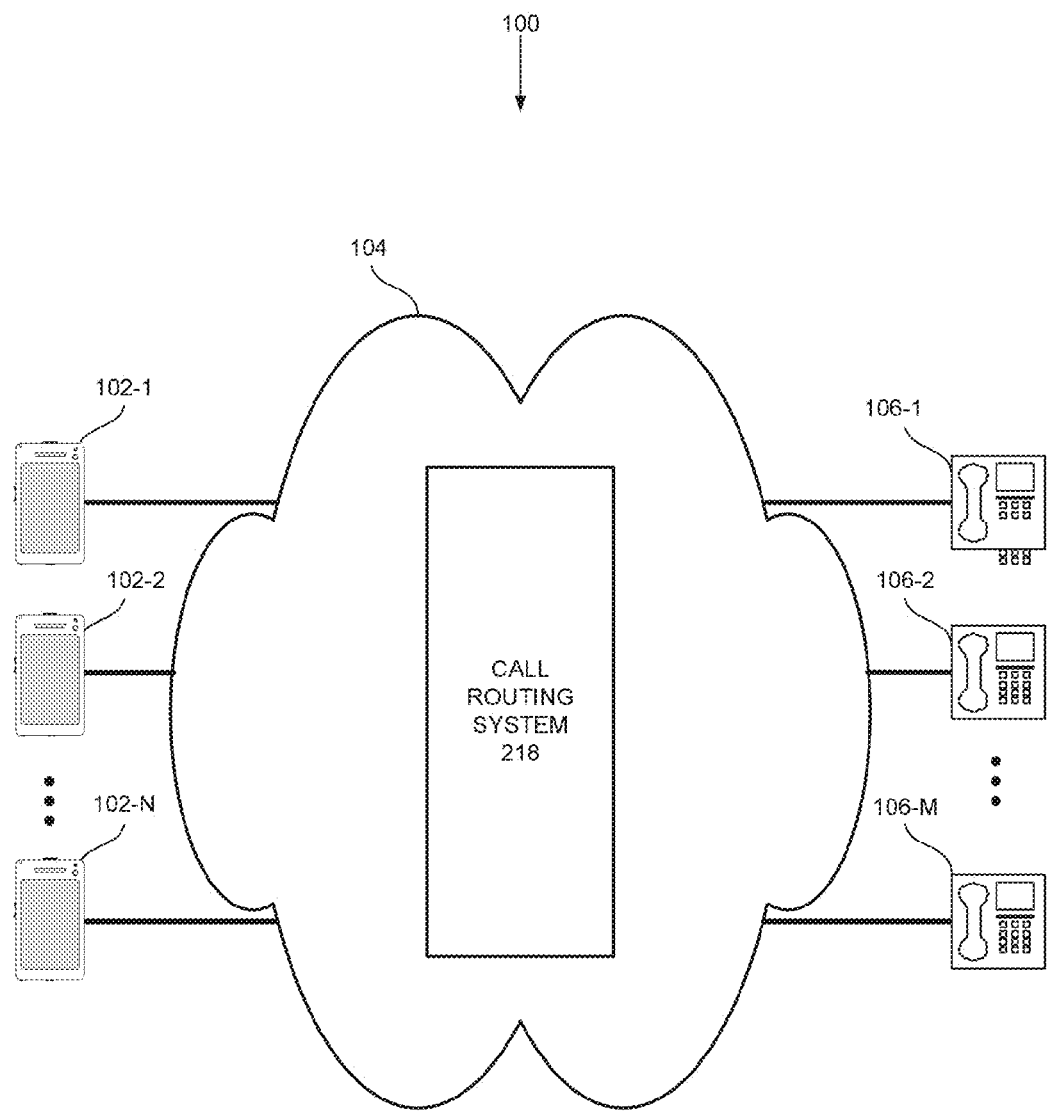
FIG. 1 illustrates an exemplary call routing based on information from a call guide.

FIG. 1 illustrates an exemplary call routing based on information from a call guide. As shown, environment 100 may include user devices 102-1 through 102-N (referred to as "user device 102" or "user devices 102"), a network 104 which includes call routing system 218, and call agent devices 106-1 through 106-M (individually "call agent device 106" or collectively "call agent devices 106"). Although user devices 102 and call agent devices 106 are illustrated as mobile phones and telephones, in other implementations, devices 102 and 106 may include other types of devices (e.g., a computer, tablet computer, or laptop with an IP phone application), etc.

User device 102 may call a call center that includes call routing system 218. User device 102 may call the call center to receive customer service, access information, purchase a product or a service, etc. Calls from user device 102 may include a Session Initiation Protocol (SIP) calls, H.323 calls, etc. These calls may include, for example, telephone calls (plain old telephones system (POTS) calls), videoconference calls, videophone calls, text messaging sessions, Voice-over-Internet Protocol (VoIP) calls, etc.

In addition, user device 102 may include a call guide. The call guide may include a client application, browser, or another type of program or component for receiving user input. After receiving the user input, the call guide may relay the user input to a server device (not shown). Based on a response from the server device, the call guide may provide the user with contact information (e.g., a direct call number or a quick code (to be described below)) to access a call agent. Depending on the user input, the call guide may allow the user to access, via the server device, a self-serve system.

Network 104 may include one or more public switched telephone networks (PSTNs) or another type of switched network (e.g., an optical network). Network 104 may also include a number of transmission towers for receiving wireless signals and forwarding the signals toward the intended destination. Network 104 may further include one or more packet switched networks, such as an Internet protocol (IP) based network, a local area network (LAN), a wide area network (WAN), a personal area network (PAN), an intranet, the Internet, or another type of network (e.g., a satellite-based network) that is capable of exchanging information.

As further shown, network 104 may include call routing system 218. In some implementations, call routing system 218 may reside in a call center or at a remote location connected to the call center over an IP network. Call routing system 218 may receive calls, park calls, guide calls through voice menus, and/or route (e.g., forward) the calls to available call agent devices 106. Call agent device 106 may connect to user device 102 via call routing system 218.

Call routing system 218, in routing/forwarding calls to call agent devices 106, identifies call agents whose skills match user/caller requirements conveyed to call routing system 218 via various mechanisms, such as speech recognition, dual tone multi-frequency (DTMF) tones, etc. Call routing system 218 may forward the calls to the identified agents.

In environment 100, when a user navigates through different options of a voice menu by interacting with an IVR system, the user sometimes may need to back track to one or more previous options. In the process, the user may listen to the same menu item multiple times. This can be time consuming, especially when the user is presented with a long list of alternatives. When using the call guide installed on user device 102, the user may select desired options in a menu that is functionally similar to the voice menu. After the user selects the options, the call guide may present the user with a number to call, may place a call to a call agent on behalf of the user, or send a message to the call agent, requesting the call agent to contact the user. The call guide may also provide user device 102 with a capability to enter into a self-help mode, in which the call guide contacts a self-serve system/device on the server side.

Figure 2:
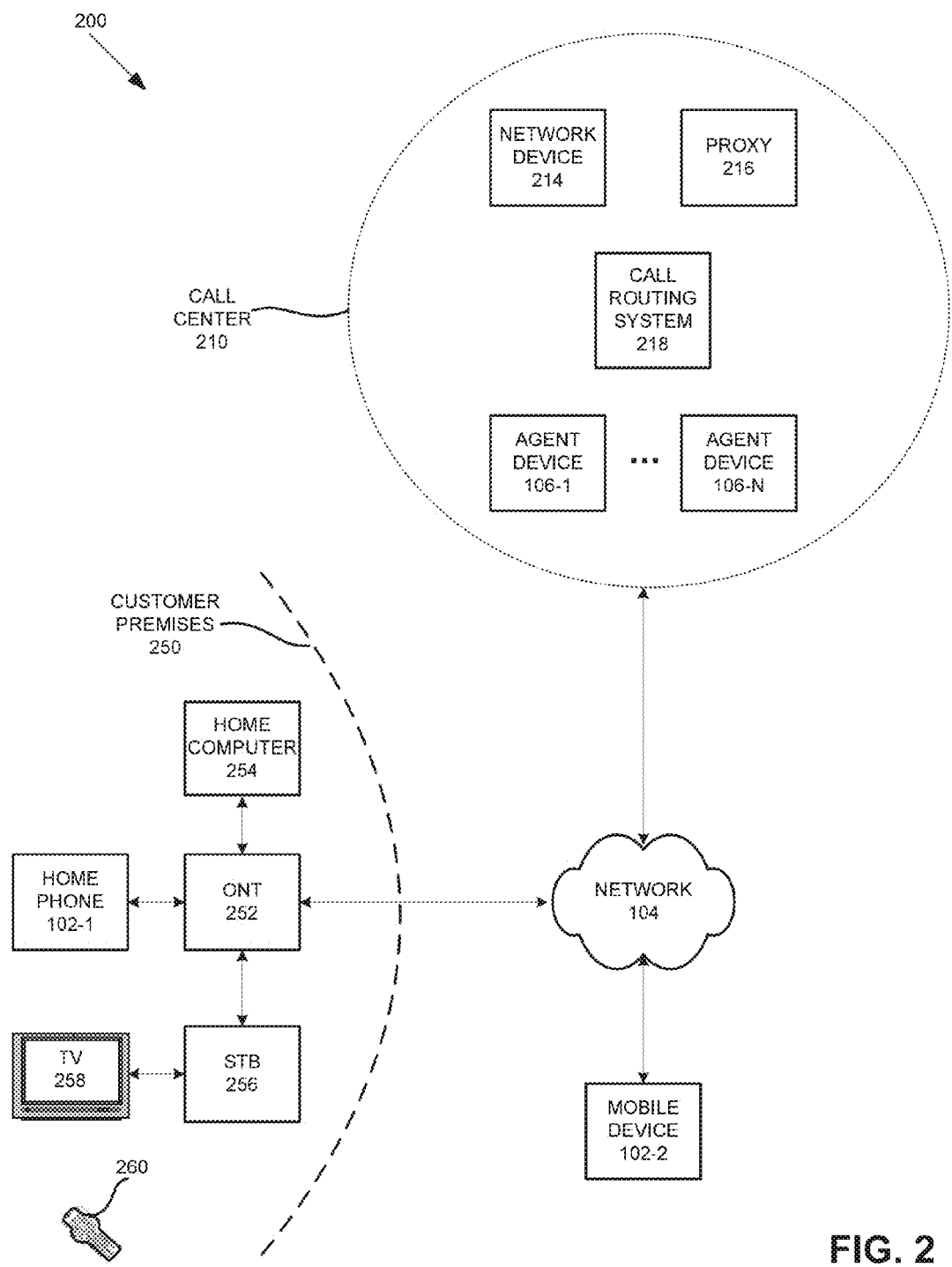
FIG. 2 is a diagram of an exemplary network in which the call routing system of FIG. 1 may be implemented.

FIG. 2 is a diagram of an exemplary network 200 in which call routing system 218 may be implemented. Network 200 may include a call center 210, customer premises 250, a network 104, and a user device 102-2 (e.g., a mobile device). Customer premises 250 (e.g., the customer's home) may include an optical network terminal (ONT) 252, a home computer 254, a set-top box (STB) 256, a TV 258, a home phone 102-1, and a remote control 260. Devices in customer premises 250, such as home computer 254, home phone 102-1, STB 256, TV 258, and remote control 260 may each be considered a "user device" (e.g., user device 102).

ONT 252 may receive data, e.g., on a fiber optic cable, and may transfer the data to the appropriate device in customer premises 250, such as computer 254 or STB 256. Likewise, ONT 252 may receive data from any device in customer premises 250 and may transmit the data to other devices in network 200, e.g., through a fiber optic cable. ONT 252 may provide customer premises 250 with Internet access, television access, or telephone service, for example.

Computer 254 may include a laptop, a desktop, a mobile telephone, a personal digital assistant (PDA), or another portable communication device. Computer 254 may include a microphone for capturing audio and/or a camera for capturing images or video. Computer 254 may also include a display for showing images or video or a speaker for playing audio.

STB 256 may receive content and output the content to TV 258 for display. STB 256 may include a component (e.g., a cable card or a software application) that plugs into a host device (e.g., a personal computer, TV 258, a stereo system, etc.) that allows the host device to display content. STB 256 may also be implemented as a home theater personal computer (HTPC), an optical disk player (e.g., digital video disk (DVD) or Blu-Ray™ disc player), a cable card, etc. STB 256 may receive commands from other devices in network 200, such as remote control 260. In one embodiment, STB 256 may include a microphone and/or a camera.

TV 258 may include speakers as well as display. TV 258 may play content, for example, received from STB 256. While some embodiments described below may use TV 258, other embodiments may use any device (e.g., computer 254 or mobile phone 102-2).

Remote control 260 may issue wired or wireless commands for controlling other electronic devices, such as TV 258 or STB 256. Remote control 260, in conjunction with STB 256, may allow a user to interact with an application running on STB 256. Other types of devices (e.g., a keyboard, a mouse, a mobile phone, etc.) may be used instead of remote control 260.

Mobile device (user device 102-2) 102-2 may include a radiotelephone, a personal communications system (PCS) terminal, a tablet computer, a personal digital assistant (PDA), a laptop, or another portable communication device. Mobile device 102-2 may communicate with other devices via one or more communication towers (not shown) using a wireless communication protocol, e.g., GSM (Global System for Mobile Communications), CDMA (Code-Division Multiple Access), WCDMA (Wideband CDMA), IEEE 802.11x, etc. Mobile device 102-2 may be associated with a phone number. Like the devices in customer premises 250, mobile device 102-2 may also be considered a "user device."

Call center 210 may include one or more servers (e.g., "network devices") that manage and/or store information associated with providing customer service to customers. As shown in FIG. 2, call center 210 may include a network device 214, a proxy 216, call routing system 218, and call agent devices 106-1 through 106-N (collectively agent devices 106, individually agent device 106).

Network device 214 may include one or more devices that allow different data networks to communicate and cooperatively carry traffic. For example, network device 214 may adapt between SS7 signaling and session initiation protocol (SIP) signaling, H.323 protocol signaling, or other protocol signaling used by other devices in network 200. In one implementation, network device 214 may convert time division multiplexed (TDM) encoded voice signals to packetized data suitable for transport to and processing by a proxy device, such as proxy 216. Network device 214 may include a gateway that provides for compatibility at two levels, e.g., between different signaling schemes and between different media forms.

Network device 214 may also include one or more session border controllers (SBCs) that provide control of the boundary between different service provider networks, provide signaling protocol compatibility between an IP-based network and other service provider networks, or control the transport boundary between service provider networks. In one embodiment, network device 214 may correspond to an ingress point to proxy 216.

Proxy 216 may provide signaling services to establish sessions between devices, such as home phone 102-1 and an agent device 106. Proxy 216 may include a server or computer that is able to receive data from network device 214 and forward the received data to an appropriate device or system, such as call routing system 218 using a session signaling protocol, such as SIP or H.323. Proxy 216 may also receive data from call routing system 218 and forward the received data to other devices, such as network device 214, for example.

Call routing system 218 may distribute calls to one of agent devices 106. Call routing system 218 is illustrated as being external from proxy 216. In some implementations, call routing system 218 may include proxy 216. Call routing system 218 may forward calls to one of agent devices 106 according to an algorithm. The algorithm may be based on which of agent devices 106 has an available customer service agent, the type of issue or problem the customer is experiencing, the skill set of the customer service agent (e.g., technical skill, language skill, product knowledge, etc.), the experience of the customer service agent, the type of call, the type of customer, etc. In addition, call routing system 218 may allow a user at user device 102 to resolve a problem or issue by interacting with one or more modules/devices in system 218, without contacting a call agent in call center 210.

Agent device 106 may include a workstation, computer, or another type of device for a customer service agent to use for handling calls from customers. Agent device 106 may include a telephone, a camera, a microphone, a speaker, and/or a headset including a microphone and speaker. Agent device 106 may also include a software-implemented telephone (e.g., a "soft" phone) or a hardware implemented telephone (e.g., a "hard" phone). Agent device 106 may also include software or hardware for performing packet-based data transmission to transmit data such as voice, video, or text.

Network 104 is described above with reference to FIG. 1. In FIG. 2, network 104 may allow devices at customer premises 250 (e.g., a computer 254 or STB 256) to connect to other devices also attached to network 104, such as third party web site servers (not shown) or other customers (not shown).

The exemplary configuration of devices in network 200 is illustrated for simplicity. Network 200 may include more devices, fewer devices, or a different configuration of devices than illustrated in FIG. 2. For example, network 200 may include thousands or millions of customer premises. In some embodiments, the functions performed by two or more devices may be performed by one device Likewise, in some embodiments, the functions performed by any one device may be performed by multiple devices. Further, the connections shown in FIG. 2 are exemplary. In other embodiments, additional connections that are not shown in FIG. 2 may exist between devices (e.g., each device may be connected to every other device). The connections in FIG. 2 may also be wireless or wired.

Figure 3:
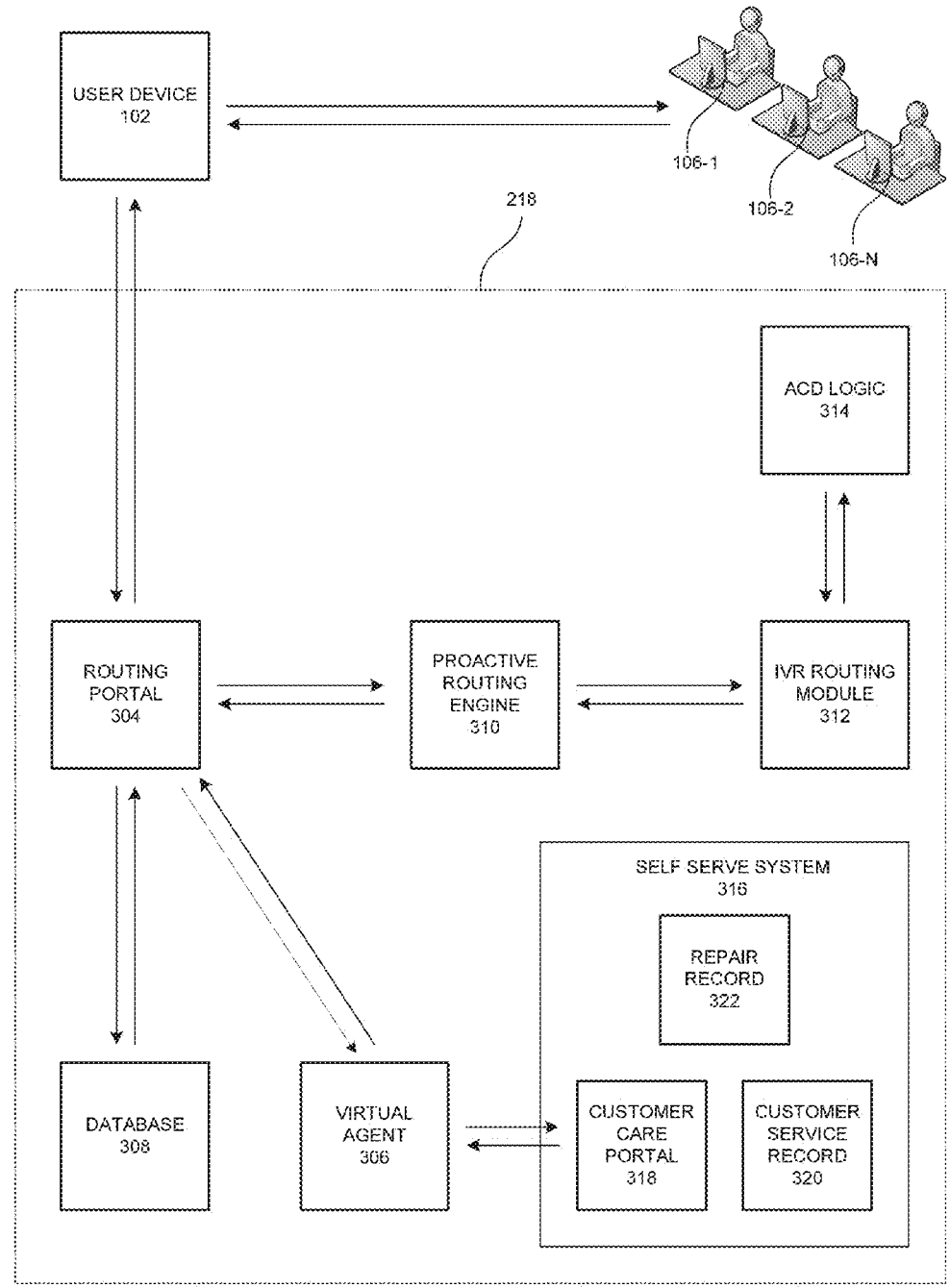
FIG. 3 is a diagram of exemplary devices of the call routing system of FIG. 2.

FIG. 3 is a diagram of exemplary devices of call routing system 218. As shown, call routing system 218 may include a routing portal device 304, virtual agent device 306, database device 308, proactive routing engine 310, IVR routing module 312, automatic call distribution (ACD) logic 314, and self-serve system 316 (also called self-help system 316). Depending on the implementation, call routing system 218 may include additional, fewer, different or different arrangement of components than those illustrated in FIG. 3. For example, in one implementation, devices 304-314 may be implemented as one device. In other implementations, additional devices may perform the functionalities of devices 304-314.

Routing portal device 304 may receive input from a call guide (e.g., a browser and web page, a client application, etc.) on user device 102, send the received user input to proactive routing engine 310, and receive information (e.g., contact information (e.g., a phone number, IP address, Universal Resource Locator (URL), Universal Resource Identifier (URI), Media Access Control (MAC) address, etc.) of a call agent, a quick code/reference number, etc.) from proactive routing engine 310. Upon receipt of the contact information, routing portal device 304 may send the contact information to the call guide on user device 102. In some implementations, routing portal device 304 may send user related information (e.g., account information) and user input to IVR routing module 312/ACD logic 314, eventually to be forwarded to call agent 106.

Virtual agent device 306 may receive all or a portion of the user input from routing portal device 304, process the portion (e.g., parse the portion), and output graphical user interface (GUI) information (e.g., a web page (e.g., a HTML fragment)) that may be sent by routing portal device 304 to the call guide on user device 102. As routing portal device 304 receives user input from a user at user device 102, routing portal device 304 may continue to send portions of the user input to virtual agent device 306, which in turn, may provide additional GUI information to routing portal device 304. Virtual agent device 306 and routing portal device 304 may continue to exchange information, until portal device 304 no longer receives additional information from virtual agent device 306.

When the user at user device 102 selects a self-help option of the call guide, routing portal device 304 may relay the selection form the call guide to virtual agent device 306. In turn, virtual agent device 306 may interact with self-serve system 316. Based on information provided via self-serve system 316, virtual agent device 318 may provide user device 102 (via routing portal device 304) with menus, information, and/or options for self-help. The menus/options may be sent to routing portal device 304, which may then relay the information to user device 102.

Database 308 may store and retrieve a user-specific data. For example, when a user at user device 102 attempts to log in at routing portal device 304, routing portal device 304 may authenticate the user based on security information stored in database 308. Database 308 may include, for example, user identifier (e.g., a logon ID), password, user privileges, account number, etc.

Proactive routing engine 310 may receive the user input from user device 102 via routing portal device 304 from user device 102, convert the received user input into a format that IVR routing module 312 can process, and send the converted user input to IVR routing module 312. Conversely, when proactive routing engine 310 receives a response (e.g., information for contacting call agent device 106) from IVR routing module 312, proactive routing engine 310 may translate the response to a format that routing portal device 304 can present to the call guide on user device 102 (e.g., translate the response to a hypertext mark-up language (HTML) page) and transmit the translated response to routing portal device 304.

IVR routing module 312 may include a call routing database for forwarding incoming phone calls. When IVR routing module 312 receives the converted user input from proactive routing engine 310, IVR routing module 312 may look in the call routing database to identify call agent device(s) 106 to which IVR routing module 312 can forward a specific call. Furthermore, from the call routing database, IVR routing module 312 may obtain contact information that is associated with the identified call agent devices(s) (e.g., a phone number, an IP address of call agent device 106, a URL, URI, etc.) and/or a quick code/reference number.

ACD logic 314, in combination with IVR routing module 312, may route or forward incoming calls to call agent devices 106. When ACD logic 314/IVR routing module 312 receives an incoming call from user device 102, IVR routing module 312 may present user device 102 with a voice menu that provide the user with an opportunity to enter a quick code (e.g., via dual-tone multi-frequency (DTMF) tones, or via speech). Upon receipt of user selection of menu options and/or entry of the quick code, ACD logic 314/IVR routing module 312 may direct the call to the call agent device 106 or place the call on a priority waiting queue. IVR routing module 312/ACD logic 314 may forward calls waiting in the priority queue to call agent devices 106 before forwarding calls waiting in queues with lower priorities.

In addition to routing calls, ACD logic 314/IVR routing module 312 may temporarily park messages/information that is sent by routing portal device 304. The information may be associated with a particular phone number (e.g., phone number of the user and/or the call agent) and/or a domain name (e.g., domain name of a call agent device 106). When a user associated with the information calls the call agent, ACD logic 314/IVR routing module 312 may route the parked information to the call agent device 106 associated with the call agent. Accordingly, the call agent may be provided with information that is associated with the caller or a problem, for handling the call.

Self-serve system 316 may include hardware and/or software components for providing self-help information to the call guide at user device 102. As shown, self-serve system 316 may include a customer care portal device 318, a customer service record device 320, and/or a repair record device 322. Although devices 318-322 are shown as separate devices, devices 318-322 may be implemented as a single device or implemented as part virtual agent device 306, another device, and/or one or more software components.

Customer care portal device 318 may receive a self-help message from virtual agent 308. The self-help message may include, for example, a request to create a new problem record, a user account number, self-help type information (e.g., a repair or a service), etc. If the self-help message is for a service, customer care portal device 318 may contact customer service record device 320. If the self-help message is for a repair, customer care portal device 318 may contact repair record device 322. As user device 102 and virtual agent device 306 interact and progress toward a problem resolution, customer care portal device 318 may send information (received from virtual agent device 306) describing the interaction and the progress to either customer service record device 320 or repair record device 322.

In instances where the self-help message does not include a message to create a new problem record, the message may include a request to fetch information about an existing, unresolved problem (e.g., a problem for which a record already exists). In such instances, customer care portal device 318 may retrieve information associated with the problem from either customer service record device 320 or repair record device 322, depending on the problem type. By using the information (conveyed via customer care portal device 318), virtual agent device 306 may return to the last saved state of the self-help session between virtual agent device 306 and the call guide at user device 102.

Customer service record device 320 may create, upon receiving a request via customer care portal device 318, a new record for a new problem related to a customer service, and return a problem tracking number to virtual agent device 306, via a customer care portal device 318. In addition, as virtual agent device 306 and user device 102 interact (via routing portal device 304) and progress toward a problem resolution, customer record device 320 may store description of the progress and their interaction, as relayed by customer care portal device 318. For an existing problem, customer service record device 320 may fetch an existing record, and provide the record to virtual agent device 306 via customer care portal device 318.

Repair record device 322 may operate similarly as customer service record device 320. However, in contrast to customer service record device 320, repair record device 322 may create, store, and/or retrieve information related to repairs.

Figure 4:
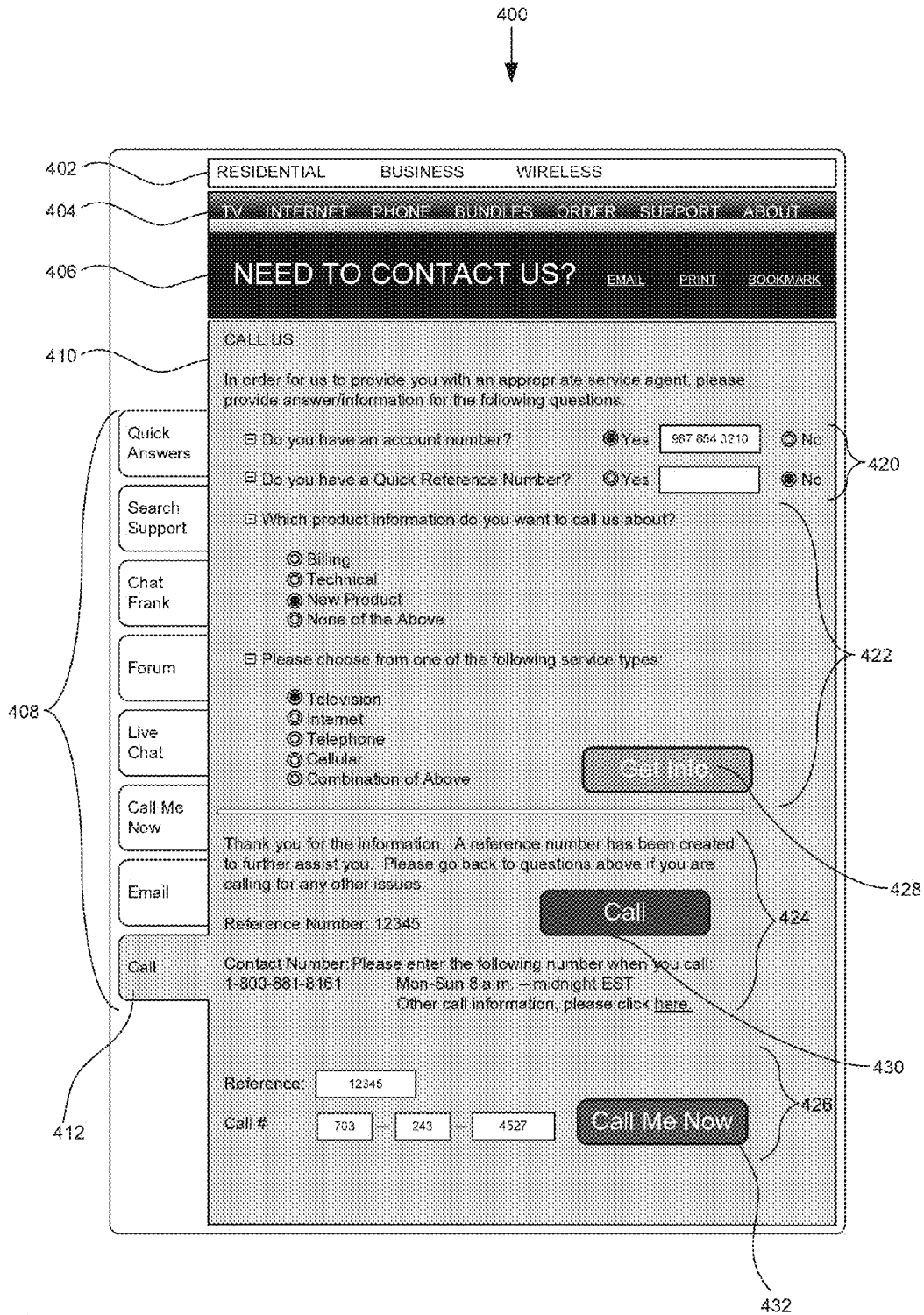
FIG. 4 illustrates a view of an exemplary graphical user interface (GUI) of the call guide.

FIG. 4 illustrates a view of an exemplary GUI 400 of the call guide stored on or executed by user device 102. As shown, GUI 400 may include a customer type menu bar 402, service type menu bar 404, quick link menu bar 406, function tabs 408, and presentation pane 410.

Customer type menu bar 402 and service type menu bar 404 may provide options for a user to select the type of customer or the type of service for which the user intends to use the call guide (e.g., residential customer, business customer, wireless customer, TV service, Internet service, phone service, bundled service, support, etc.). Quick link menu bar 406 may provide hyperlinks to activate various functions, such as emailing, printing, etc.

Function tabs 408 may provide for different functionalities to the user. For example, a function tab may provide for a chat session (e.g., a live chat session), posting messages to a forum, emailing, searching a particular web site, or answers to frequently asked questions (FAQs).

Presentation pane 410 may present information to the user and/or receive user input. In one implementation, the call guide may display presentation pane 410 for a particular function tab 408 when the function tab 408 is selected. For example, in FIG. 4, when the user activates call function tab 412, the call guide may display presentation pane 410 for performing a function similar to navigating voice menus and for obtaining contact information of a call agent.

As shown in FIG. 4, presentation pane 410 for call function tab 412 may include account number/reference number components 420, questions area 422, reference information area 424, and call request area 426. Depending on the implementation, presentation pane 410 may include additional, fewer, different, or different arrangement of components than those illustrated in FIG. 4. For example, in one implementation, account number/reference number components 420 and questions area 422 may be shown on different windows/pages.

Account number/reference number components 420 may allow a user to input account number and/or a reference number. Questions area 422 may provide questions to which the user can respond, for example, by selecting an answer, inputting text, etc. For example, in FIG. 4, questions area 422 includes the questions/requests "which produce information do you want to call us about?" and "Please choose from the one of the following service types." Questions area 422 also includes selectable answers for the questions, such as "billing question," "technical question," "new product information," "none of the above," "television," "Internet," "telephone," "cellular," etc.

As also shown in FIG. 4, questions area 422 may also include get information button 428. After the user inputs data in account number/reference number components 420 and provides answers to the questions in questions area 422, the user may activate get information button 428. Activating get information button 428 may cause the call guide to send the input data and/or selected answers to routing portal device 304, which may relay the input information to proactive routing engine 310. Depending on the implementation, questions area 422 may include additional, fewer, or different types of questions than those illustrated in FIG. 4.

Reference information area 424 may display information (e.g., calling number, reference number, etc.) received from routing portal device 304. Routing portal device 304 may provide the information to the call guide in response to receiving the information from proactive routing engine 310. As shown in FIG. 4, reference information area 424 displays a reference number (e.g., a quick code) and a telephone number, as well as times when call agents are available to receive the call.

In some implementations, reference area 424 may include a call button 430. When the user activates call button 430, user device 102 may call a call agent device 106 in accordance with the contact information provided in reference information area 424. In another implementation, reference information area 424 may not include call button 430. In some of these implementations, user device 102 may automatically call the call agent device 106 when the call guide on user device 102 receives the contact information from routing portal device 304.

Call request area 426 may allow a user to request that a call agent call the user. As shown in FIG. 4, the user may provide a reference number and a user's telephone number. In other implementations, the call guide may automatically place the reference number and the telephone number of user device 102 in call request area 426. User device 102 may have received the reference number during the user's interaction with the call guide, or during a prior phone call to call center 210.

As further shown in FIG. 4, call request area 426 may include a call me now button 432. When the user activates call me now button 432, the call guide may send the reference number and the user's telephone number to routing portal device 304. Upon receipt of the information, routing portal device 304 may obtain, either in a local storage or by querying IVR routing module 312, contact information of call agent device 106 corresponding to the reference number and/or the phone number. The call agent at call agent device 106 may then call the user at user device 102 based on a predetermined time window that may be selected by the user.

In some implementations, routing portal device 304 may use the contact information to send a message to the call agent device 106. The message may include a request to call user device 102, as well as additional information provided by the user, such as the user's telephone number (which may be different from the telephone number of user device 102), a problem description, a priority level, documentation (e.g., a file provided by the user via the call guide), etc. In other implementations, routing portal device 304 may send the contact information to the call guide on user device 102, which may then send a message to the call agent device 106. When a call agent at the call agent device 106 receives the message, the call agent may call user device 102.

Depending on the implementation, GUI 400 may include another view with additional, fewer, different, or different arrangement of components than those illustrated in FIG. 4. For example, although not shown in FIG. 4, GUI 400 for the call guide may also include menus or pages for self-help. In another example, in one implementation, GUI 400 may not include function tabs 408 and/or quick link bar 406. In another implementation, instead of function tabs 408, GUI 400 may provide for the functionalities of function tabs 408 via another menu bar.

Figure 5:
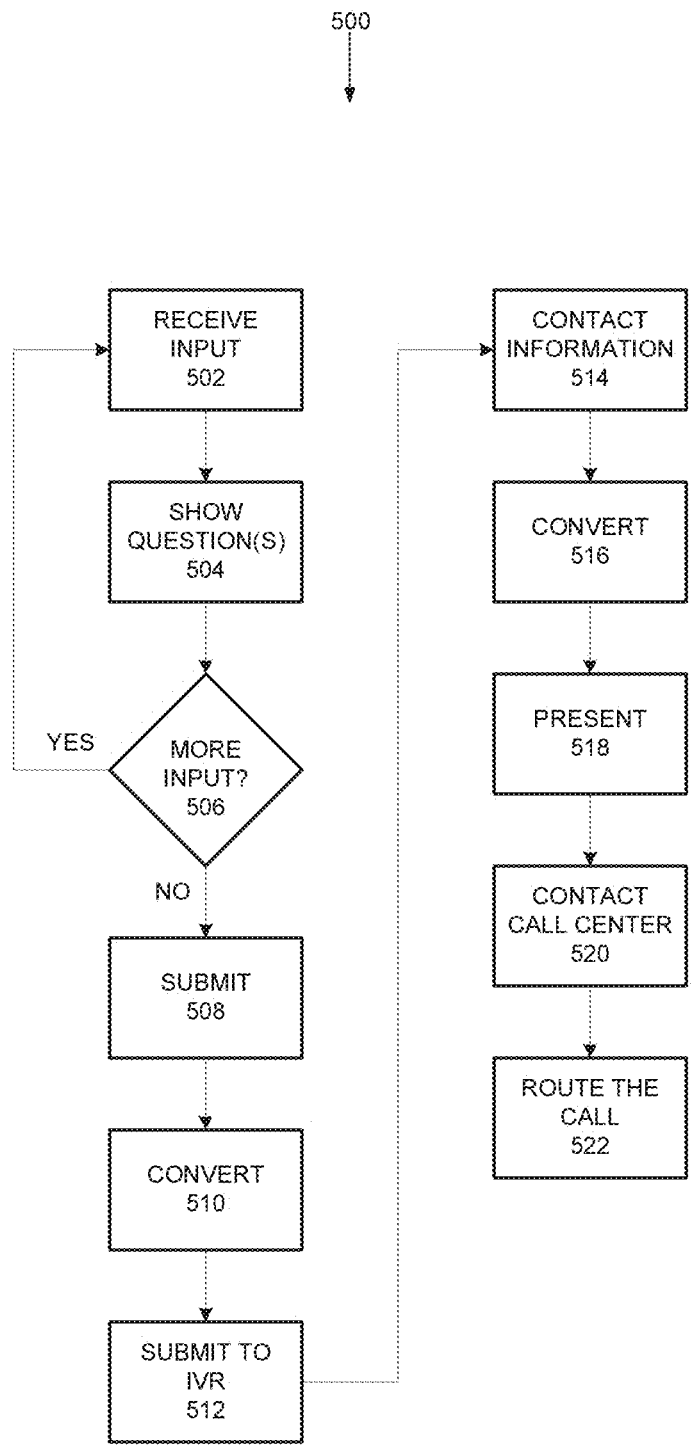
FIG. 5 is a flow diagram of an exemplary process that is associated with using the call guide.

FIG. 5 is a flow diagram of an exemplary process 500 that is associated with using the call guide. Process 500 may be performed by one or more of devices 102, 106, and 304-314 or components functionally equivalent to devices 102, 106, and 304-314. Assume that a call guide is running on user device 102. As shown, process 500 may include the call guide receiving user input (block 502). For example, the user may indicate the type of service (see FIG. 4) or the type of information for which the user intends to call the call center 210. The call guide may send the received input to routing portal device 304.

When routing portal device 304 receives the user input from the call guide, routing portal device 304 may send all or a portion of the received information to virtual agent device 306. In response, virtual agent device 306 may interpret the received user input and send a reply. Based on the reply, routing portal device 304 may send, to the call guide, a message that may include questions or requests for the user.

For example, assume that the user has selected "television" to the question/request, "Please choose from one of the following service type." The call guide may send the answer to virtual agent device 306. In response, virtual agent 306 may send another set of question(s) and selectable answers (e.g., "Please select the type of television" and "HD television," "IP TV," etc.).

When the call guide receives the message, if more information needs to be obtained from the user (block 506: yes), the call guide may display the questions/request provided in the message on user device 102 and return to block 502. If no additional information needs to be obtained from the user (block 506: no), process 500 may proceed to block 508.

The call guide may submit the user input to routing portal device 304 (block 508), which may relay the user input to proactive routing engine 310. Upon receipt of the user input, proactive routing engine 310 may convert the user input into a format that can be input or delivered to IVR routing module 312 (block 510). Thereafter, proactive routing engine 310 may submit a query, which includes a portion or all of the converted user input, to IVR routing module 312, to obtain call agent contact information (block 512).

In response, IVR routing module 312 may determine, based on the information provided in the query, the identity of a call agent device(s) 106 that may best handle a call from the user. IVR routing module 312 may also obtain contact information associated with the call agent device(s) 106 (block 514). The contact information may include, for example, a telephone number, a quick code, an IP address, a queue corresponding to the call agent devices 106, etc. IVR routing module 312 may send the contact information to proactive routing engine 310.

When proactive routing engine 310 receives the contact information from IVR routing module 312, proactive routing engine 310 may translate the contact information into a format that can be relayed by routing portal device 304 to the call guide on user device 102 (block 516). For example, proactive routing engine 310 may translate the contact information to the HTML format. After the translation, proactive routine engine 310 may send the translated contact information (e.g., HTML page or HTML fragment) to routing portal device 304, which in turn may relay the translated contact information to the call guide on user device 102.

The call guide on user device 102 may receive and present the translated contact information to the user (block 518). In addition, the call guide on user device 102 may contact call center 210 based on the contact information (block 520). Upon contacting or calling call center 210, user device 102 may be temporarily connected to an IVR or the like, and IVR routing module 312 may provide the call guide with an opportunity to enter a quick code included in the contact information. When the call guide provides the quick code, the IVR routing module 312 routes the call to an appropriate call agent device 106 or places the call on a priority queue (block 522). In a different implementation, when the call guide presents the converted contact information to the user, the user may manually place a call to call center 210. The user may provide the quick code to IVR routing module 312 via speech or DTMF tones.

Whether user device 102 automatically or manually calls call center 210, when the call is placed, routing portal device 304 may obtain information the user input via GUI 400 (e.g., a problem description), and send the information to ACD logic 314/IVR routing module 312. The information may be parked at ACD logic 314/IVR routing module 312. When the call is received from user device 102, at ACD logic 314/IVR routing module 312, may route the parked information to call agent device 106 associated with the call agent to whom the call is to be routed.

Depending on the implementation, the call guide may also provide the user with an option (see FIG. 4) to send a message to a call agent, to request the call agent to call the user. In some implementations, when the user selects the option, the call guide may send the request to routing portal device 304 or the corresponding call agent device 106. In response, routing portal device 304 may notify call agent device 106 of the user's request along with the user's contact information (e.g., phone number of user device 102). Depending on the implementation, routing portal device 304 may also provide the call agent device 106 with other information, such as the problem description, any documents provided by the user, user's answers to questions, etc. Call agent device 106 may display some of such information to the corresponding call agent via a GUI interface.

In other implementations, routing portal device 304 may provide the call guide on user device 102 with the contact information of the call agent device 106. In these implementations, the call guide may notify the call agent device 106 of the user's request. When the call agent receives the notification from the call guide (along with the other information), the call agent may contact the user.

In process 500, when the user opts to self-help (e.g., via GUI 400), user device 102 and virtual agent device 306 may interact via routing portal device 304. As described above, virtual agent device 306 may store/retrieve information related to a problem (e.g., repair problem, service problem) at self-serve system 316. After the interaction (e.g., after a session in which a problem is not resolved), if the user chooses to contact call center 210, the user may use the call guide in contacting a call agent. In such instances, when the user makes a request to call the call agent or user device 102 is about to call the call agent, the call guide may send a request to routing portal device 304 to obtain information about the problem that the user attempted to resolve via self-help. In response, routing portal device 304 may obtain information about the problem (e.g., problem description) from self-serve system 316 via virtual agent device 306, and forward the information to ACD logic 314/IVR routing module 312, where the information may remain parked. When ACD logic 314/IVR routing module 312 receives the call from user device 102, ACD logic 314/IVR routing module 312 may forward the information to an appropriate call agent device 106 that is associated with the call agent.

Figure 6:
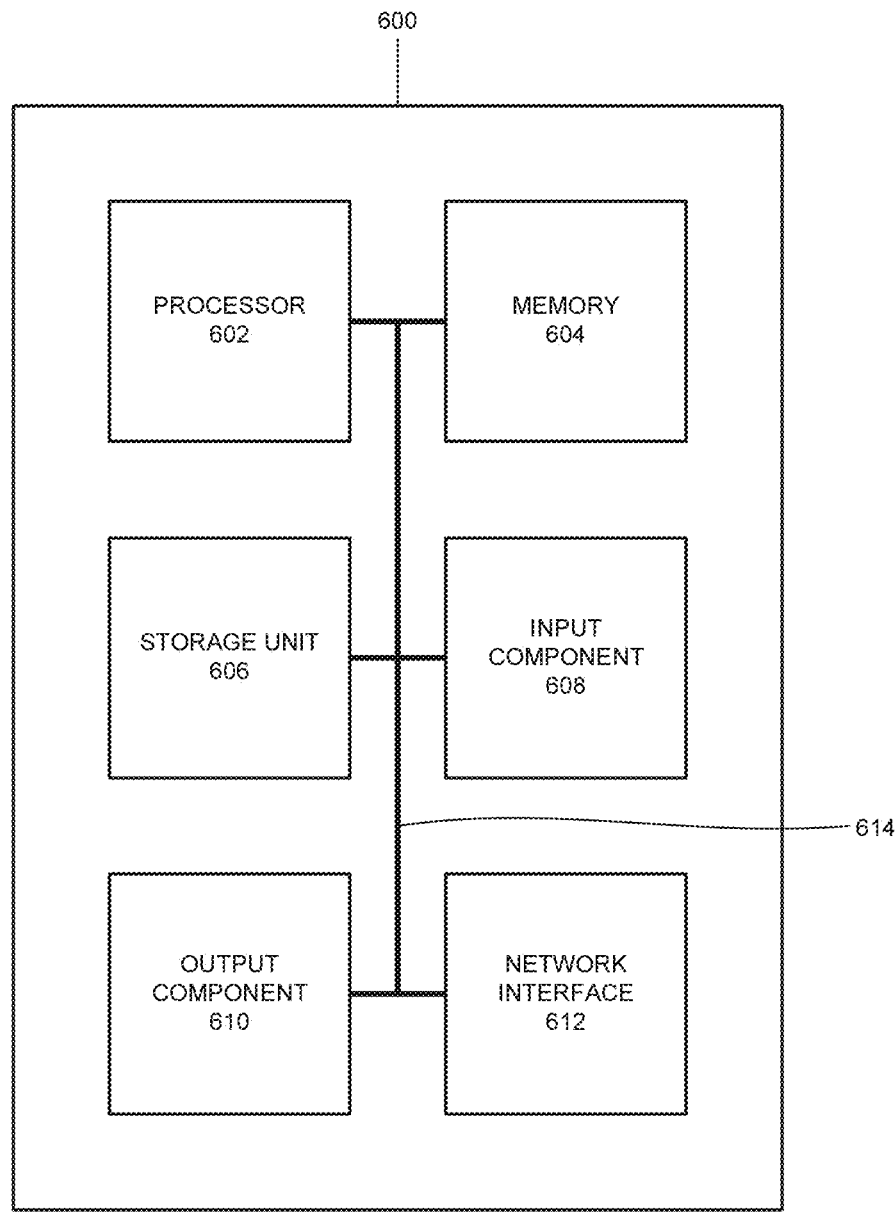
FIG. 6 is a block diagram of exemplary components of a device of FIGS. 1 through 3.

FIG. 6 is a block diagram of an exemplary network device 600, which may correspond to one or more of devices 102, 106, and 302-314. As shown, device 600 may include a processor 602, memory 604, storage unit 606, input component 608, output component 610, network interface 612, and communication path 614. In different implementations, device 600 may include additional, fewer, different, or different arrangement of components than the ones illustrated in FIG. 6. For example, device 600 may include line cards for connecting to external buses.

Processor 602 may include a processor, a microprocessor, an Application Specific Integrated Circuit (ASIC), a Field Programmable Gate Array (FPGA), and/or other processing logic (e.g., embedded devices) capable of controlling device 600. Memory 604 may include static memory, such as read only memory (ROM), and/or dynamic memory, such as random access memory (RAM), or onboard cache, for storing data and machine-readable instructions (e.g., programs, scripts, etc.). Storage unit 606 may include a floppy disk, CD ROM, CD read/write (R/W) disc, and/or flash memory, as well as other types of storage devices (e.g., hard disk drive) for storing data and/or machine-readable instructions (e.g., a program, script, etc.).

Input component 608 and output component 610 may provide input and output from/to a user to/from device 600. Input/output components 608 and 610 may include a display screen, a keyboard, a mouse, a speaker, a microphone, a camera, a DVD reader, Universal Serial Bus (USB) lines, and/or other types of components for converting physical events or phenomena to and/or from signals that pertain to device 600.

Network interface 612 may include a transceiver (e.g., a transmitter and a receiver) for device 600 to communicate with other devices and/or systems. For example, via network interface 612, device 600 may communicate over a network, such as the Internet, an intranet, a terrestrial wireless network (e.g., a WLAN, WiFi, WiMax, etc.), a satellite-based network, optical network, etc. Network interface 612 may include a modem, an Ethernet interface to a LAN, and/or an interface/connection for connecting device 600 to other devices (e.g., a Bluetooth interface).

Communication path 614 may provide an interface through which components of device 600 can communicate with one another.

In the above description, call routing system 218 may provide for use of a call guide. The call guide may include a browser or a stand-alone client application for providing a function that is similar to a voice menu. However, the call guide may be more convenient to use than the voice menu. When a user uses a call guide, the call guide may obtain a phone number and/or a quick code/reference number. The user may reach a call agent at call center 210 by dialing the phone number and using the quick code. By using the call guide, the user may avoid navigating through a voice menu provided by an IVR system at call center 210. In addition, the call guide may allow the user to access self-serve system 316. Self-serve system 316 may interact with user device 102 via different components (e.g., devices 304 and 306), and allow the user to resolve a particular problem or an issue without involving a call agent.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, although various embodiments/implementations have been described above with respect to placing phone calls to call center 210 (e.g., Voice-over-IP calls or POTS calls), in other implementations, user device 102 may contact call center 210 via other ways of communicating, such as text messaging, short messaging service (SMS) messages, emails, etc. In such implementations, the questions provided by the call guide on user device 102 may be used to route the emails, initiate text messaging sessions, and/or perform other functions associated with matching the user to a call agent with requisite skills.

In another example, assume that user device 102 interacts with routing portal device 304 to provide GUI 400 to the user. In some implementations, during the interaction, routing portal device 304 may retrieve information about the user from database 308 (e.g., history of the user's activity, answers that the user provided in the past via GUI 400, etc.) and send the information to user device 102. The call guide on user device 102 may use the information to pre-populate GUI 400.

While series of blocks have been described with regard to an exemplary process illustrated in FIG. 5, the order of the blocks may be modified in other implementations. In addition, non-dependent blocks may represent acts that can be performed in parallel to other blocks. Furthermore, one or more of the blocks may be omitted in other implementations.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
displaying, via a graphical user interface at a user device, questions corresponding to questions in a voice menu that is used by an interactive voice response (IVR) system to forward calls;
obtaining, via the graphical user interface, user responses to the questions, the questions providing options for selecting a self-serve system and a call agent;
when the call agent is selected, sending information corresponding to the user responses to a first device, wherein the first device is configured to:
query the IVR system to identify the call agent, in a call center, whose profile matches the information, and
obtain contact information of the identified call agent from the IVR system; and
when the self-serve system is selected, sending information corresponding to the user responses to a second device, wherein the second device is configured to:
process the information via a virtual agent, and
obtain an output from the virtual agent as a result of the processing; and
displaying either the contact information or the output from the virtual agent at the user device.

2. The method of claim 1, further comprising:
receiving authentication information from the graphical user interface; and
performing authentication based on the authentication information from the graphical user interface and user-specific information stored in a database.

3. The method of claim 1, wherein the virtual agent is further configured to send a self-help message to a self-help system, to fetch information about an unresolved problem.

4. The method of claim 3, wherein the virtual agent is further configured to:
return to a last saved state of a past self-help session based on the fetched information about the unresolved problem.

5. The method of claim 1, wherein the graphical user interface comprises a display area that includes:
a first area for selecting a function from a set of one or more functions comprising at least a call function for obtaining contact information of a call agent; and
a second area for displaying, for a function selected in the first area, one or more input components, information pertaining to the selected function, and a component for invoking the function.

6. The method of claim 5, wherein when the function is invoked via the component, the virtual agent provides the function via the self-serve system.

7. The method of claim 5, wherein when the call function is invoked via the component, the second area displays at least one of:
first components for obtaining a user identifier from a user of the user device;
second components for obtaining call information that includes reasons for which the user wants to call the call center; and
an activation component for generating a reference number that identifies a particular call agent based on the user identifier and the call information obtained via the first and second components,
wherein when the user inputs the reference number via a call to the call center, the call is forwarded to the particular call agent identified by the reference number.

8. The method of claim 7, wherein the display area further includes a third area for displaying the reference number; and
wherein the second area includes fourth components for notifying the particular call agent to call the user.

9. The method of claim 8, wherein the fourth components include a component for the user to input a telephone number, wherein the telephone number is for use by the particular call agent to call the user when the particular call agent is notified, via the fourth components, to call the user.

10. The method of claim 8, wherein the third area includes a call button,
wherein when the call button is activated at the user device, the user device automatically calls the particular call agent identified by the reference number.

11. The method of claim 5, wherein the set of one or more functions further include one of:
an email function; or
a chat function.

12. A system comprising:
a first device configured to:
receive from a user device a graphical user interface, answers to questions corresponding to questions in a voice menu that is used by an interactive voice response (IVR) system to forward calls;
obtain, via the graphical user interface at a user device, user responses to the questions, the questions providing options for selecting a self-serve system and a call agent; and
when the call agent is selected, send information corresponding to the user responses to a second device, wherein the second device configured to:
query the IVR system to identify the call agent, in a call center, whose profile matches the information, and
obtain contact information of the identified call agent from the IVR system; and
when the self-serve system is selected, send information corresponding to the user responses to a third device, wherein the third device configured to:
process the information via a virtual agent; and
obtain an output from the virtual agent as a result of the processing.

13. The system of claim 12, wherein the first device is further configured to:
receive authentication information from the graphical user interface; and
perform authentication based on the authentication information and user-specific information stored in a database.

14. The system of claim 12, wherein the graphical user interface comprises a display area that includes:
a first area for selecting a function from a set of one or more functions comprising at least a call function for obtaining contact information of a call agent;
a second area for displaying, for a function selected in the first area, one or more input components, information pertaining to the selected function, and a component for invoking the function.

15. The system of claim 14, wherein when the function is invoked via the component, the virtual agent provides the function via the self-serve system.

16. The system of claim 14, wherein when the function is selected via the component, the second area displays at least one of:

first components for obtaining a user identifier from a user of the user device;

second components for obtaining call information that includes reasons for which the user wants to call the call center; and an activation component for generating a reference number that identifies a particular call agent based on the user identifier and the call information obtained via the first and second components, wherein when the user inputs the reference number via a call to the call center, the call is forwarded to the particular call agent identified by the reference number.

17. The system of claim 16, wherein the display area further includes a third area for displaying the reference number; and wherein the second area includes fourth components for notifying the particular call agent to call the user.

18. The system of claim 17, wherein the fourth components include a component for the user to input a telephone number to be used by the particular call agent to call the user.

19. The system of claim 17, wherein the third area includes a call button, wherein when the call button is activated via the user device, the user device automatically calls the particular call agent identified by the reference number.

20. The system of claim 16, wherein when the activation component is activated via the user device, the user device automatically calls the particular call agent identified by the reference number.

* * * * *